United States Patent
Song (10) Patent No.: US 12,511,047 B2
(45) Date of Patent: Dec. 30, 2025

(54) METHOD AND APPARATUS FOR ADJUSTING RANDOM WRITE PERFORMANCE, ELECTRONIC DEVICE, AND STORAGE MEDIUM

(71) Applicant: SUZHOU METABRAIN INTELLIGENT TECHNOLOGY CO., LTD., Jiangsu (CN)

(72) Inventor: Qi Song, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/564,565

(22) PCT Filed: Jan. 28, 2022

(86) PCT No.: PCT/CN2022/074598
§ 371 (c)(1),
(2) Date: Nov. 27, 2023

(87) PCT Pub. No.: WO2023/050672
PCT Pub. Date: Apr. 6, 2023

(65) Prior Publication Data
US 2024/0377951 A1    Nov. 14, 2024

(30) Foreign Application Priority Data
Sep. 29, 2021   (CN) .......................... 202111147105.6

(51) Int. Cl.
*G06F 3/06*   (2006.01)

(52) U.S. Cl.
CPC .............. *G06F 3/061* (2013.01); *G06F 3/064* (2013.01)

(58) Field of Classification Search
None
See application file for complete search history.

(56) References Cited

U.S. PATENT DOCUMENTS

| | | | |
|---|---|---|---|
| 8,473,707 B2 * | 6/2013 | Rowe .................... | G06F 3/0659 711/170 |
| 8,650,362 B2 * | 2/2014 | de la Iglesia ......... | G06F 3/0656 711/E12.001 |

(Continued)

FOREIGN PATENT DOCUMENTS

| | | |
|---|---|---|
| CN | 110400573 A | 11/2019 |
| CN | 111090398 A | 5/2020 |

(Continued)

OTHER PUBLICATIONS

Song et al. (CN111708491 (A)—Sep. 25, 2020 hereinafter "Song"—NPL, English Translation) (Year: 2020).*

(Continued)

*Primary Examiner* — Idriss N Alrobaye
*Assistant Examiner* — Dayton Lewis-Taylor
(74) *Attorney, Agent, or Firm* — Merchant & Gould P.C.

(57) ABSTRACT

A method for adjusting random write performance, an electronic device, and a storage medium are provided. The method includes: obtaining a remaining space of a target module of a hard drive, and performing balancing processing on a storage unit of the remaining space; calculating a quantity of data frames of each storage block in the storage unit based on a balancing processing result to obtain a first data set; performing convergence processing on the first data set to obtain a second data set; and calculating Input/Output Operations Per Second (IOPS) of the hard drive based on the second data set, and performing write arbitration adjustment on the IOPS of the hard drive.

12 Claims, 2 Drawing Sheets

(56) References Cited

U.S. PATENT DOCUMENTS 10,817,185 B1 * 10/2020 Dumitru ............... G06F 3/0655
2021/0117317 A1 4/2021 Masuo

FOREIGN PATENT DOCUMENTS

| CN | 111475115 A | 7/2020 |
| CN | 111708491 A | 9/2020 |
| CN | 112416255 A | 2/2021 |
| CN | 113590050 A | 11/2021 |

OTHER PUBLICATIONS

Chinese Search Report received for CN Application No. 2021111471056 on Nov. 4, 2021, 2 pgs.
International Search Report & Written Opinion for PCT International Serial No. PCT/CN2022/074598 on Jun. 8, 2022, 9 pgs.

* cited by examiner

METHOD AND APPARATUS FOR ADJUSTING RANDOM WRITE PERFORMANCE, ELECTRONIC DEVICE, AND STORAGE MEDIUM

CROSS-REFERENCE TO RELATED APPLICATION

This application is a National Stage Filing of the PCT International Application No. PCT/CN2022/074598 filed on Jan. 28, 2022, which claims priority to Chinese Patent Application No. 202111147105.6, filed on Sep. 29, 2021, with the Chinese National Intellectual Property Administration (CNIPA), the contents of which are hereby incorporated by reference in its entirety.

TECHNICAL FIELD

The present disclosure relates to the field of hardware control technologies, and in particular, to a method for adjusting random write performance, an electronic device, and a storage medium.

BACKGROUND

In the information age in which data volume grows exponentially, fast and effective storage and processing of data has become an important research direction. The speed of a mechanical hard drive may no longer meet a computing speed of a current Central Processing Unit (CPU). Solid-state disks (also referred to as solid-state drive, abbreviated as SSD) have gradually become mainstream storage devices due to their advantages of high read and write speed and small size, and are widely applied in various fields of life. With the wide application in various fields of life, the performance of the solid-state drives has also received attention. The solid-state drives have the following characteristics and limitations due to the principle of NAND contained in the solid-state drives: typically, it takes a dozen of milliseconds to erase a Block; it takes about several milliseconds to write data to a Block; and it only takes tens of microseconds to read data from a block; and optionally, a single DIE is capable of performing only one type of operation at the same time. With the widespread application of the solid-state drives in the consumption field, solid-state drives have gradually been introduced at an enterprise level due to their high random access performance, low power consumption, high environmental stability, and the like. Unlike the solid-state drives in the consumption field which focus more on the peak performance, enterprise-level solid-state drives focus on performance consistency. Typically, for example, a maximum read delay is required to be within 500 us and a maximum write delay is required to be within 10 ms. During this period, when there are read and write requests, blockage may be caused by other time-consuming operations, increasing a command response delay. When a host initiates a read/write request, and a time-consuming erase operation is being performed in a solid-state drive, the read/write request needs to be delayed until the erase operation on a Block is completed, so there is a significant delay in responding the read/write request. When a host initiates a read request, and a time-consuming write operation is performed in the solid-state drive, the read operation needs to be delayed until the write operation is completed, so there is a significant delay in responding the read operation.

SUMMARY

In view of the above, embodiments of the present disclosure provide a method and apparatus for improving random write performance of a hard drive, an electronic device, and a storage medium, which may solve the problem of unsteady Input/Output Operations Per Second (IOPS) performance of the hard drive due to low random write performance of a hard drive.

According to a first aspect, the embodiments of the present disclosure provide a method for adjusting random write performance, including:
  obtaining a remaining space of a target module of a hard drive, and performing balancing processing on a storage unit of the remaining space;
  calculating a quantity of data frames of each storage block in the storage unit based on a balancing processing result to obtain a first data set;
  performing convergence processing on the first data set to obtain a second data set; and
  calculating Input/Output Operations Per Second (IOPS) of the hard drive based on the second data set, and performing write arbitration adjustment on the IOPS of the hard drive.

According to the method for adjusting the random write performance provided in the embodiments of the present disclosure, balancing processing is performed on the storage unit of the remaining space of the hard drive, the quantity of the data frames of each storage block in the storage unit is calculated, and the IOPS of the hard drive may be calculated based on the quantity of the data frames of each storage block, so that the IOPS of the hard drive may be automatically determined and analyzed, and steady-state adjustment may be performed on the IOPS according to a determination and analysis result through a write arbitration control module, thereby preventing imbalanced fluctuations in the IOPS and improving the consistency of the IOPS of random write in the hard drive.

In conjunction with the first aspect, in a first implementation of the first aspect, the operation of obtaining the remaining space of the target module of the hard drive, and performing balancing processing on the storage unit of the remaining space includes:
  determining whether a quantity of storage blocks in the storage unit exceeds a preset threshold;
  when the quantity of storage blocks in the storage unit exceeds the preset threshold, performing a first operation of writing data into the storage unit in a first state; and
  when the quantity of storage blocks in the storage unit does not exceed the preset threshold, performing a second operation of writing data into the storage unit in a second state.

According to the method for adjusting the random write performance provided in the embodiments of the present disclosure, whether the quantity of storage blocks in the storage unit exceeds the preset threshold is determined, and different operations are performed according to a determining result. A storage unit with free storage blocks is selected from the storage units and data writing is performed in the selected storage unit first, so that a speed of writing in the storage block is balanced with a speed of erasing from the storage block.

In conjunction with the first aspect, in a second implementation of the first aspect, the operation of performing convergence processing on the first data set to obtain the second data set includes:
  calculating a quantity of data frames of the remaining space in a steady state based on states of the storage blocks to obtain a second data subset; and performing interpolation processing on data in the second data subset to obtain the second data set.

According to the method for adjusting the random write performance provided in the embodiments of the present disclosure, the quantity of the data frames of the remaining space in the steady state is calculated based on the states of the storage blocks to obtain the second data subset. By removing damaged blocks from the storage blocks and calculating the quantity of the data frames of the remaining storage blocks, a fluctuation caused by newly recycled storage blocks may be reduced, thereby improving the consistency. After obtaining the second data subset, interpolation processing is performed on the data in the second data subset to obtain the second data set, so that a fluctuation range of the quantity of the data frames in the storage blocks decreases and tends to be in a steady state.

In conjunction with the first aspect, in a third implementation of the first aspect, the operation of calculating the IOPS of the hard drive based on the second data set, and performing write arbitration adjustment on the IOPS of the hard drive includes:

obtaining a phase state of the remaining space and the quantity of the data frames in the second data set in the phase state; and obtaining the IOPS of the hard drive based on the quantity of the data frames, and adjusting the IOPS of the hard drive.

According to the method for adjusting the random write performance provided in the embodiments of the present disclosure, the corresponding quantity of the data frames may be obtained according to the phase state of the remaining space, and the IOPS of the hard drive may be calculated according to the quantity of the data frames. The IOPS is adjusted according to each phase state corresponding to the IOPS, so as to provide smoother adjustment and improve the consistency.

In conjunction with the third implementation of the first aspect, in a fourth implementation of the first aspect, the operation of obtaining the phase state of the remaining space includes:

obtaining a first phase based on a range from a quantity of data frames corresponding to a write arbitration adjustment start state to a quantity of data frames corresponding to a write arbitration adjustment forbidden state;

obtaining a second phase based on a range from the quantity of the data frames corresponding to the write arbitration adjustment forbidden state to a quantity of data frames corresponding to a write arbitration adjustment stop state;

obtaining a third phase based on the quantity of the data frames corresponding to the write arbitration adjustment stop state; and calculating the IOPS of the hard drive based on the first phase, the second phase, and the third phase.

According to the method for adjusting the random write performance provided in the embodiments of the present disclosure, the IOPS of the hard drive is calculated based on the first phase, the second phase, and the third phase. The corresponding quantities of the data frames may be obtained based on different phases, and the IOPS of the hard drive may be calculated according to the quantities of the data frames. The IOPS is adjusted according to different phases of the IOPS, and the corresponding consistency may also be improved.

In conjunction with the fourth implementation of the first aspect, in a fifth implementation of the first aspect, the operation of adjusting the IOPS of the hard drive includes:

forming a reference fluctuation curve based on a quantity of data frames corresponding to a write arbitration adjustment steady state;

determining a fluctuation condition of a first fluctuation curve formed by the second data set and a fluctuation condition of the reference fluctuation curve; and adjusting the IOPS of the hard drive based on the fluctuation conditions.

According to the method for adjusting the random write performance provided in the embodiments of the present disclosure, the quantity of the data frames in each storage block continuously changes as the write and erase operations of the hard drive are performed, so that the first fluctuation curve formed by the second data set is also fluctuant. However, the reference fluctuation curve is formed according to the quantity of the data frames corresponding to the steady state in write arbitration adjustment, and whether the IOPS of the hard drive is high or low may be determined by comparing and analyzing constantly changing first fluctuation curve with the reference fluctuation curve. Therefore, by adjusting the IOPS taking the reference fluctuation curve as a standard, the first fluctuation curve may tend to be in line with the reference fluctuation curve, thereby improving the consistency of random write of the hard drive.

In conjunction with the fifth implementation of the first aspect, in a sixth implementation of the first aspect, the operation of determining the fluctuation condition of the first fluctuation curve formed by the second data set and the fluctuation condition of the reference fluctuation curve includes:

when the first fluctuation curve is greater than the reference fluctuation curve, adjusting the IOPS of the hard drive to be a first preset threshold; and when the first fluctuation curve is less than the reference fluctuation curve, adjusting the IOPS of the hard drive to be a second preset threshold.

According to the method for adjusting the random write performance provided in the embodiments of the present disclosure, Whether the IOPS of the hard drive is high or low may be determined by comparing and analyzing the fluctuation condition of the first fluctuation curve with the fluctuation condition of the reference fluctuation curve, so as to correspondingly adjust the IOPS, thereby improving the consistency of random write of the hard drive and also relatively improving the performance of the hard drive.

In conjunction with the second implementation of the first aspect, in a seventh implementation of the first aspect, the operation of performing interpolation processing on the data in the second data subset to obtain the second data set further includes:

performing interpolation processing on the data in the second data subset, wherein performing interpolation processing on the data in the second data subset comprises: establishing coordinate axes comprising a horizontal axis representing time t, and a vertical axis representing the quantity y of the data frames of the remaining space, wherein $(x_i, y_i)$ represents a quantity of data frames cached at a previous time point, and $(x_{i+1}, y_{i+1})$ represents a latest quantity of data frames; performing linear interpolation on $(x_i, y_i)$ and $(x_{i+1}, y_{i+1})$ to obtain a point $(x, y)$ as a linear interpolation result; and obtaining the second data set based on the linear interpolation result.

According to a second aspect, the embodiments of the present disclosure provide an apparatus for adjusting random write performance, including:

a balancing processing module, configured to obtain a remaining space of a target module of a hard drive, and perform balancing processing on a storage unit of the remaining space;

a data quantity obtaining module, configured to calculate a quantity of data frames of each storage block in the storage unit based on a balancing processing result to obtain a first data set;

a convergence module, configured to perform convergence processing on the first data set to obtain a second data set; and an adjustment module, configured to calculate IOPS of the hard drive based on the second data set, and perform write arbitration adjustment on the IOPS of the hard drive.

In conjunction with the second aspect, in an eighth implementation of the second aspect, the operation of performing convergence processing on the first data set to obtain the second data set includes:

calculating a quantity of data frames of the remaining space in a steady state based on states of the storage blocks to obtain a second data subset; and performing interpolation processing on the data in the second data subset, wherein performing interpolation processing on the data in the second data subset comprises: establishing coordinate axes comprising a horizontal axis representing time t, and a vertical axis representing the quantity y of the data frames of the remaining space, wherein (xi, yi) represents a quantity of data frames cached at a previous time point, and (xi+1, yi+1) represents a latest quantity of data frames; performing linear interpolation on (xi, yi) and (xi+1, yi+1) to obtain a point (x, y) as a linear interpolation result; and obtaining the second data set based on the linear interpolation result.

According to the apparatus for adjusting the random write performance provided in the embodiments of the present disclosure, balancing processing is performed on the storage unit of the remaining space of the hard drive, the quantity of the data frames of each storage block in the storage unit is calculated, and the IOPS of the hard drive may be calculated based on the quantity of the data frames of each storage block, so that the IOPS of the hard drive may be automatically determined and analyzed, and steady-state adjustment may be performed on the IOPS according to a determination and analysis result through a write arbitration control module, so as to prevent imbalanced fluctuations in the IOPS and improve the consistency of the IOPS of the random write of the hard drive.

In conjunction with the second aspect, in a first implementation of the second aspect, the above balancing processing module includes:

a threshold determining module, configured to determine whether a quantity of storage blocks in the storage unit exceeds a preset threshold;

a first operation module, configured to perform a first operation of writing data into the storage unit in a first state when the quantity of storage blocks in the storage unit exceeds the preset threshold; and a second operation module, configured to perform a second operation of writing data into the storage unit in a second state when the quantity of storage blocks in the storage unit does not exceed the preset threshold.

In conjunction with the second aspect, in a second implementation of the second aspect, the above convergence module includes:

a second data subset obtaining module, configured to calculate a quantity of data frames of the remaining space in a steady state based on states of the storage blocks to obtain a second data subset; and a second data set obtaining module, configured to perform interpolation processing on data in the second data subset to obtain the second data set.

In conjunction with the second aspect, in a third implementation of the second aspect, the above adjustment module includes:

a state obtaining module, configured to obtain a phase state of the remaining space and the quantity of the data frames in the second data set in the phase state; and an adjusting module, configured to obtain the IOPS of the hard drive based on the quantity of the data frames, and adjust the IOPS of the hard drive.

In conjunction with the third implementation of the second aspect, in a fourth implementation of the second aspect, the above state obtaining module includes:

a first state obtaining module, configured to obtain a first phase based on a range from a quantity of data frames corresponding to a write arbitration adjustment start state to a quantity of data frames corresponding to a write arbitration adjustment forbidden state;

a second phase obtaining module, configured to obtain a second phase based on a range from the quantity of the data frames corresponding to the write arbitration adjustment forbidden state to a quantity of data frames corresponding to a write arbitration adjustment stop state;

a third phase obtaining module, configured to obtain a third phase based on the quantity of the data frames corresponding to the write arbitration adjustment stop state; and a calculation module, configured to calculate the IOPS of the hard drive based on the first phase, the second phase, and the third phase.

In conjunction with the fourth implementation of the second aspect, in a fifth implementation of the second aspect, the above state obtaining module includes:

a reference fluctuation curve obtaining module, configured to form a reference fluctuation curve based on a quantity of data frames corresponding to a write arbitration adjustment steady state;

a determination and analysis module, configured to determine a fluctuation condition of a first fluctuation curve formed by the second data set and a fluctuation condition of the reference fluctuation curve; and an adjusting module, configured to adjust the IOPS of the hard drive based on the fluctuation conditions.

In conjunction with the fifth implementation of the second aspect, in a sixth implementation of the second aspect, the above determination and analysis module includes:

a first adjustment module, configured to adjust the IOPS of the hard drive to be a first preset threshold when the first fluctuation curve is greater than the reference fluctuation curve; and a second adjustment module, configured to adjust the IOPS of the hard drive to be a second preset threshold when the first fluctuation curve is less than the reference fluctuation curve.

According to a third aspect, the embodiments of the present disclosure provide an electronic device, including a memory and a processor. The memory and the processor are in communication connection with each other. The memory stores computer instructions. The processor executes the computer instructions to perform the method for adjusting the random write performance in the first aspect or in any implementation of the first aspect.

According to a fourth aspect, the embodiments of the present disclosure provide a computer-readable storage medium. The computer-readable storage medium stores computer instructions. The computer instructions, when running in a computer, cause the computer to perform the method for adjusting the random write performance in the first aspect or in any implementation of the first aspect.

BRIEF DESCRIPTION OF THE DRAWINGS

To describe the exemplary implementations of the present disclosure or the technical solutions in the related art more clearly, drawings required to be used in the illustration of the exemplary implementations or the related art will be briefly introduced below. Apparently, the drawings in the illustration below are some implementations of the present disclosure. Those having ordinary skill in the art may also obtain other drawings according to these drawings without creative efforts.

DETAILED DESCRIPTION

In order to make the objectives, technical schemes and advantages of the embodiments of the present disclosure clearer, the technical schemes in the embodiments of the present disclosure will be described clearly and completely below in combination with the drawings in the embodiments of the present disclosure. Apparently, the embodiments described are part of the embodiments of the present disclosure, not all the embodiments. Based on the embodiments in the present disclosure, all other embodiments obtained by those having ordinary skill in the art without creative effort shall fall within the protection scope of the present disclosure.

It should be noted that the method for adjusting random write performance provided according to the embodiments of the present disclosure may be performed by an apparatus for adjusting random write performance. The apparatus for adjusting the random write performance may be implemented as a part or an entirety of a computer device by means of software, hardware, or a software and hardware combination. The computer device may be a server or a terminal. The server in the embodiments of the present disclosure may be one server, or may be a server cluster composed of a plurality of servers. The terminal in the embodiments of the present disclosure may be a smart phone, a personal computer, a tablet, a wearable device, a smart robot, and another smart hardware device. The following method embodiments are all explained by taking the implementation of the method by an electronic device as an example.

Figure 1:
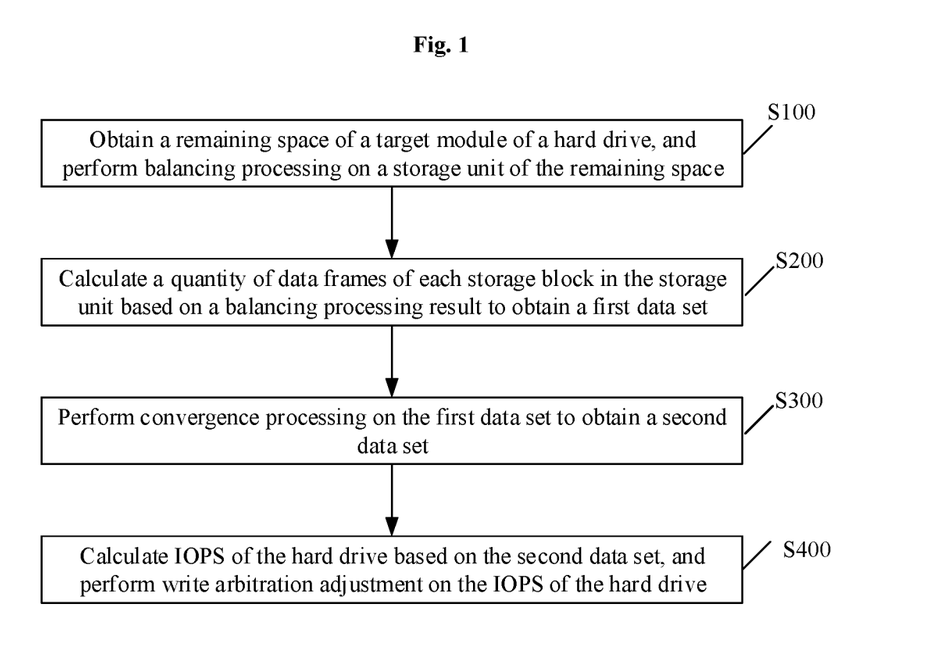
FIG. 1 is a flowchart of a method for adjusting random write performance provided according to the embodiments of the present disclosure.

In an embodiment of the present disclosure, as shown in FIG. 1, a method for adjusting random write performance is provided. Taking the implementation of the method in an electronic device as an example for explanation, the method includes the following operations S100 to S400.

At S100, a remaining space of a target module of a hard drive is obtained, and balancing processing is performed on a storage unit of the remaining space.

In the information age in which data volume grows exponentially, fast and effective storage and processing of data has become an important research direction. The speed of a mechanical hard drive may no longer meet a computing speed of a current CPU. Solid-state drives (also referred to as solid-state drive, abbreviated as SSD) have gradually become mainstream storage devices due to their advantages of high read and write speed and small size, and are widely applied in various fields of life. With the wide application in various fields of life, the performance of the solid-state drives has also received attention. However, the write speed of a hard drive is inconsistent with the erase speed of the hard drive. When the write speed is relatively high, and the erase speed is relatively low, the hard drive includes a relatively small amount of storage blocks, which may affect the performance of the hard drive when IOPS of the hard drive is too large. Similarly, when the write speed is relatively low, and the erase speed is relatively high, when the IOPS of the hard drive is too small, it may also affect the data transmission speed of the hard drive. Therefore, balance adjustment needs to be performed according to states of data frames in storage blocks, thereby determining in which storage block the write operation is performed first.

At S200, a quantity of data frames of each storage block in the storage unit is calculated based on a balancing processing result to obtain a first data set.

In this embodiment, the quantity of the data frames of each storage block in the storage unit is calculated based on the balancing processing result to statistically obtain a quantity of free data frames, thus obtaining the first data set. The IOPS of the hard drive may be calculated according to the first data set, so that it is convenient to analyze and adjust the IOPS of the hard drive subsequently.

At S300, convergence processing is performed on the first data set to obtain a second data set.

In this embodiment, a fluctuation condition between the data frames may be determined according to the first data set. In a case where the data frames fluctuate greatly, it indicates that the IOPS of the hard drive is unsteady. In this case, convergence processing is performed on the first data set to reduce the fluctuation of the first data set, thus obtaining a converged second data set. In this way, the fluctuation of the data frames may tend to be in a steady state.

At S400, IOPS of the hard drive is calculated based on the second data set, and write arbitration adjustment is performed on the IOPS of the hard drive.

In this embodiment, after the converged second data set is obtained, the IOPS of the hard drive may be calculated according to the second data set, so that the IOPS of the hard drive may be directly obtained. When the IOPS is too large, the IOPS needs to be decreased to reduce the depletion speed of the storage blocks. When the IOPS is too low, the IOPS needs to be increased to increase the depletion speed of the storage blocks.

According to the method for adjusting the random write performance provided in the embodiments of the present disclosure, balancing processing is performed on the storage unit of the remaining space of the hard drive, the quantity of the data frames of each storage block in the storage unit is calculated, and the IOPS of the hard drive may be calculated based on the quantity of the data frames of each storage block, so that the IOPS of the hard drive may be automatically determined and analyzed, and steady-state adjustment may be performed on the IOPS according to a determination and analysis result through a write arbitration control module, thereby preventing imbalanced fluctuations in the IOPS and improving the consistency of the IOPS of random write in the hard drive.

In an exemplary embodiment of the present disclosure, the operation S100 of obtaining a remaining space of a target module of a hard drive, and performing balancing processing on a storage unit of the remaining space described above includes:

(1) whether a quantity of storage blocks in the storage unit exceeds a preset threshold is determined;
(2) when the quantity of storage blocks in the storage unit exceeds the preset threshold, a first operation of writing data into the storage unit in a first state is performed; and
(3) when the quantity of storage blocks in the storage unit does not exceed the preset threshold, a second operation of writing data into the storage unit in a second state is performed.

In this embodiment, whether the quantity of the storage blocks in a storage unit with a smallest quantity of free storage blocks and the quantity of the storage blocks in a storage unit with a largest quantity of storage blocks exceed a preset threshold is first determined. For example, the preset threshold may be set to 3.

When the quantity does not exceed the preset threshold, whether the storage unit is in a free state is continued to be determined. The free state refers to a state that no free storage block has currently been selected from the storage unit to fill data. When a storage unit is in a free state, the storage unit is selected. When a plurality of storage units are in free states, a storage unit with a small quantity of free storage blocks is selected for data writing.

When the quantity exceeds the preset threshold, the state determination on the storage unit is skipped, and the storage unit with the small quantity of free storage blocks is selected, that is, a free storage block is selected from the storage unit for data writing.

The above method may balance the speed of writing data in the hard drive with the speed of erasing data from the hard drive, thereby improving the efficiency.

According to the method for adjusting the random write performance provided in the embodiments of the present disclosure, whether the quantity of storage blocks in the storage unit exceeds the preset threshold is determined, and different operations are performed according to a determining result. A storage unit with free storage blocks is selected from the storage units and data writing is performed in the selected storage unit first, so that a speed of writing in the storage block is balanced with a speed of erasing from the storage block.

In an exemplary embodiment of the present disclosure, the operation S300 of performing convergence processing on the first data set to obtain a second data set described above includes:

(1) a quantity of data frames of the remaining space in a steady state is calculated based on states of the storage blocks to obtain a second data subset; and
(2) interpolation processing is performed on data in the second data subset to obtain the second data set.

After the first data set is obtained, a new quantity of data frames is calculated based on the idea of Long Short-Term Memory (LSTM), thus obtaining the second data subset, which may reduce the fluctuation on the target module caused by new recycled storage blocks and improve the consistency.

During the calculation of the quantity of data frames of the remaining space in the steady state, the quantity of the storage blocks varies throughout the entire data writing process. For example, B1, B2, B3, . . . , and Bn represent changes in the quantity of the storage blocks. According to an actual damage condition of the storage blocks, the remaining space where the remaining data frames are located is calculated as FB1, FB2, FB3, . . . , and FBn, and avgFB1, avgFB2, avgFB3, . . . and avgFBn correspond to a historical average data frame quantity space at Bn. Setting avgFB1=FB1, there is:

$$avgFBn+1 = (\beta\ avgFBn + FBn + 1)/(\beta + 1) \qquad \text{Formula 1}$$

where the value of $\beta$ controls to perform averaging only on the latest multiple FBns, which borrows the idea of the LSTM. A result of each calculation is input to next interpolation processing.

How to determine the specific value of $\beta$ is provided as follows. Space data of free data frames in a process from an adjustment state to a steady state of random write is obtained in actual applications, and the value of $\beta$ is calculated so that the data of the free data frames fluctuates less during the steady-state process after being calculated by the above formula, which is basically in line with an actual test situation. After comparison, when the value of $\beta$ is 0.9, a fluctuation curve of avgFBn+1 is close to an original fluctuation curve and has a small fluctuation range. After calculation by Formula 1, avgFBn+1 in the steady state changes little.

In the next operation, the interpolation processing is performed on the data in the second data subset using a linear interpolation principle. In the operation, coordinate axes including a horizontal axis representing time t, and a vertical axis representing the quantity y of the data frames of the remaining space are established, wherein (xi, yi) represents a quantity of data frames cached at a previous time point, and (xi+1, yi+1) represents a latest quantity of data frames; linear interpolation is performed on (xi, yi) and (xi+1, yi+1) to obtain a point (x, y) as a linear interpolation result. In the embodiments of the present disclosure, the value x takes a center point of a calculation cycle, and y is an average value of vertical axis values of two points. A proportion of the horizontal axis may also be adjusted according to a consistency result.

The following formula may be obtained according to the interpolation principle to calculate a quantity of new data frames.

$$y = y_i + \frac{x - x_i}{x_{i+1} - x_i} \times (y_{i+1} - y_i)$$

After new data is cached at each time, the above formula is used for calculation. Since the calculation cycle is fixed at 5 ms, and x is the center point of the calculation cycle, y is an average value of two adjacent points.

A curve formed by the second data set is more convergent than a curve of the second data subset, but the change trends of the curve formed by the second data set and the curve of the second data subset remain consistent. Therefore, the curve formed by the second data set is used to perform write arbitration control on the IOPS of the hard drive, which may make the IOPS control more stable.

According to the method for adjusting the random write performance provided in the embodiments of the present disclosure, the quantity of the data frames of the remaining space in the steady state is calculated based on the states of the storage blocks to obtain the second data subset. By removing damaged blocks from the storage blocks and calculating the quantity of the data frames of the remaining storage blocks, a fluctuation caused by newly recycled storage blocks may be reduced, thereby improving the consistency. After obtaining the second data subset, interpolation processing is performed on the data in the second data subset to obtain the second data set, so that a fluctuation range of the quantity of the data frames in the storage blocks decreases and tends to be in a steady state.

In an exemplary embodiment of the present disclosure, the operation S400 of calculating IOPS of the hard drive based on the second data set, and performing write arbitration adjustment on the IOPS of the hard drive described above includes:
(1) a phase state of the remaining space and the quantity of the data frames in the second data set in the phase state are obtained; and
(2) the IOPS of the hard drive is obtained based on the quantity of the data frames, and the IOPS of the hard drive is adjusted.

According to the method for adjusting the random write performance provided in the embodiments of the present disclosure, the corresponding quantity of the data frames may be obtained according to the phase state of the remaining space, and the IOPS of the hard drive may be calculated according to the quantity of the data frames. The IOPS is adjusted according to each phase state corresponding to the IOPS, so as to provide smoother adjustment and improve the consistency.

In an exemplary embodiment of the present disclosure, the above operation of obtaining a phase state of the remaining space includes:
(1) a first phase is obtained based on a range from a quantity of data frames corresponding to a write arbitration adjustment start state to a quantity of data frames corresponding to a write arbitration adjustment forbidden state;
(2) a second phase is obtained based on a range from the quantity of the data frames corresponding to the write arbitration adjustment forbidden state to a quantity of data frames corresponding to a write arbitration adjustment stop state;
(3) a third phase is obtained based on the quantity of the data frames corresponding to the write arbitration adjustment stop state; and
(4) the IOPS of the hard drive is calculated based on the first phase, the second phase, and the third phase.

In the exemplary embodiment, start_credit_num (start state) is the quantity of the data frames corresponding to free storage blocks that are involved in start of write arbitration adjustment; steady_num (stable state) is the quantity of the data frames corresponding to free storage blocks during the write arbitration adjustment in the steady state; forbid_credit_num (forbidden state) is the quantity of the data frames corresponding to free storage blocks where IOPS is initially prohibited; and stop_credit_num (stop state) is the quantity of the data frames corresponding to free storage blocks that reduce IOPS to 0.

For example, the adjustment process is divided into three phases. The first phase refers to a phase that the quantity avgFBn+1 of the data frames calculated in the second operation is from the quantity of the data frames corresponding to start_credit_num=144 to the quantity of the data frames corresponding to forbid_credit_num=24. The second phase refers to a phase that the quantity avgFBn+1 of the data frames calculated in the second operation is from the quantity of the data frames corresponding to forbid_credit_num=24 and the quantity of the data frames corresponding to stop_credit_num=18. The third phase refers to a phase that the quantity of the data frames calculated in the second operation is below the quantity of the data frames corresponding to stop_credit_num=18.

According to the method for adjusting the random write performance provided in the embodiments of the present disclosure, the IOPS of the hard drive is calculated based on the first phase, the second phase, and the third phase. The corresponding quantities of the data frames may be obtained based on different phases, and the IOPS of the hard drive may be calculated according to the quantities of the data frames. The IOPS is adjusted according to different phases of the IOPS, and the corresponding consistency may also be improved.

In an exemplary embodiment of the present disclosure, the above operation of adjusting the IOPS of the hard drive includes:
(1) a reference fluctuation curve is formed based on a quantity of data frames corresponding to a write arbitration adjustment steady state;
(2) a fluctuation condition of a first fluctuation curve formed by the second data set and a fluctuation condition of the reference fluctuation curve are determined; and
(3) the IOPS of the hard drive is adjusted based on the fluctuation conditions.

After the IOPS is calculated in the above operation of adjusting the IOPS of the hard drive, the quantity avgFBn+1, calculated according to Formula 1, in the steady state and the quantity steady_num (steady state) of the data frames need to be dynamically adjusted.

According to the method for adjusting the random write performance provided in the embodiments of the present disclosure, the quantity of the data frames in each storage block continuously changes as the write and erase operations of the hard drive are performed, so that the first fluctuation curve formed by the second data set is also fluctuant. However, the reference fluctuation curve is formed according to the quantity of the data frames corresponding to the steady state in write arbitration adjustment, and whether the IOPS of the hard drive is high or low may be determined by comparing and analyzing constantly changing first fluctuation curve with the reference fluctuation curve. Therefore, by adjusting the IOPS taking the reference fluctuation curve as a standard, the first fluctuation curve may tend to be in line with the reference fluctuation curve, thereby improving the consistency of random write of the hard drive.

In an exemplary embodiment of the present disclosure, the above operation of determining a fluctuation condition of a first fluctuation curve formed by the second data set and a fluctuation condition of the reference fluctuation curve includes:

when the first fluctuation curve is greater than the reference fluctuation curve, the IOPS of the hard drive is adjusted to be a first preset threshold; and when the first fluctuation curve is less than the reference fluctuation curve, the IOPS of the hard drive is adjusted to be a second preset threshold.

When avgFBn+1 is close to the quantity steady_num of the data frames, it is determined that the IOPS is in the steady state. When avgFBn+1 is greater than set steady_num, it indicates that there is a deviation between the steady state and a preset state, so that the preset IOPS is increased to $(1+\delta)*$IOPS. It may be set that $\delta$ here is 5%. When Bn is less than the quantity forbid_credit_num of the data frames, it indicates that the preset IOPS is too large and needs to be decreased to reduce the depletion speed of the storage blocks. The IOPS is decreased to $(1-\zeta)*$IOPS. It may be set that $\zeta$ here is 10%.

After a practical test, after applying the method provided in the embodiments of the present disclosure, the consistency has been improved from 83% to 93%, and the performance has also been improved by about 10%. Specific analysis and adjustment may be performed according to actual calculation results.

According to the method for adjusting the random write performance provided in the embodiments of the present disclosure, Whether the IOPS of the hard drive is high or low may be determined by comparing and analyzing the fluctuation condition of the first fluctuation curve with the fluctuation condition of the reference fluctuation curve, so as to correspondingly adjust the IOPS, thereby improving the consistency of random write of the hard drive and also relatively improving the performance of the hard drive.

It should be understood that although the various operations in the flowchart of FIG. 1 are shown sequentially as indicated by the arrows, the operations are not necessarily performed sequentially as indicated by the arrows. Unless specifically stated otherwise herein, the operations are not performed in a strict order, and the operations may be performed in other orders. Moreover, at least part of the operations in FIG. 1 may include a plurality of operations or phases that are not necessarily performed at the same time, but may be performed at different moments. These operations or phases are not necessarily performed in sequence, but rather may be performed in turn or alternation with other operations or at least part of operations or phases among other operations.

Figure 2:
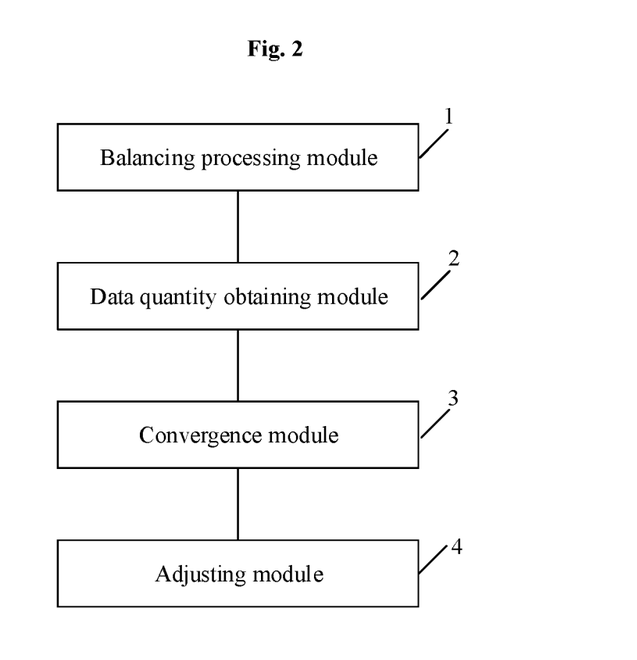
FIG. 2 is a diagram showing functional modules contained in an apparatus for adjusting random write performance provided according to the embodiments of the present disclosure.

As shown in FIG. 2, this embodiment provides an apparatus for adjusting random write performance, including a balancing processing module 1, a data quantity obtaining module 2, a convergence module 3, and an adjustment module 4.

The balancing processing module 1 is configured to obtain a remaining space of a target module of a hard drive, and perform balancing processing on a storage unit of the remaining space;

the data quantity obtaining module 2 is configured to calculate a quantity of data frames of each storage block in the storage unit based on a balancing processing result to obtain a first data set;

the convergence module 3 is configured to perform convergence processing on the first data set to obtain a second data set; and the adjustment module 4 is configured to calculate IOPS of the hard drive based on the second data set, and perform write arbitration adjustment on the IOPS of the hard drive.

According to the apparatus for adjusting the random write performance provided in the embodiments of the present disclosure, balancing processing is performed on the storage unit of the remaining space of the hard drive, the quantity of the data frames of each storage block in the storage unit is calculated, and the IOPS of the hard drive may be calculated based on the quantity of the data frames of each storage block, so that the IOPS of the hard drive may be automatically determined and analyzed, and steady-state adjustment may be performed on the IOPS according to a determination and analysis result through a write arbitration control module, so as to prevent imbalanced fluctuations in the IOPS and improve the consistency of the IOPS of the random write of the hard drive.

In an embodiment of the present disclosure, the above balancing processing module includes:

a threshold determining module, configured to determine whether a quantity of storage blocks in the storage unit exceeds a preset threshold;

a first operation module, configured to perform a first operation of writing data into the storage unit in a first state when the quantity of storage blocks in the storage unit exceeds the preset threshold; and a second operation module, configured to perform a second operation of writing data into the storage unit in a second state when the quantity of storage blocks in the storage unit does not exceed the preset threshold.

In an embodiment of the present disclosure, the above convergence module includes:

a second data subset obtaining module, configured to calculate a quantity of data frames of the remaining space in a steady state based on states of the storage blocks to obtain a second data subset; and a second data set obtaining module, configured to perform interpolation processing on data in the second data subset to obtain the second data set.

In an embodiment of the present disclosure, the above adjustment module includes:

a state obtaining module, configured to obtain a phase state of the remaining space and the quantity of the data frames in the second data set in the phase state; and an adjusting module, configured to obtain the IOPS of the hard drive based on the quantity of the data frames, and adjust the IOPS of the hard drive.

In an embodiment of the present disclosure, the above state obtaining module includes:

a first state obtaining module, configured to obtain a first phase based on a range from a quantity of data frames corresponding to a write arbitration adjustment start state to a quantity of data frames corresponding to a write arbitration adjustment forbidden state;

a second phase obtaining module, configured to obtain a second phase based on a range from the quantity of the data frames corresponding to the write arbitration adjustment forbidden state to a quantity of data frames corresponding to a write arbitration adjustment stop state;

a third phase obtaining module, configured to obtain a third phase based on the quantity of the data frames corresponding to the write arbitration adjustment stop state; and a calculation module, configured to calculate the IOPS of the hard drive based on the first phase, the second phase, and the third phase.

In an embodiment of the present disclosure, the above state obtaining module includes:

a reference fluctuation curve obtaining module, configured to form a reference fluctuation curve based on a quantity of data frames corresponding to a write arbitration adjustment steady state;

a determination and analysis module, configured to determine a fluctuation condition of a first fluctuation curve formed by the second data set and a fluctuation condition of the reference fluctuation curve; and an adjusting module, configured to adjust the IOPS of the hard drive based on the fluctuation conditions.

In an embodiment of the present disclosure, the above determination and analysis module includes:

a first adjustment module, configured to adjust the IOPS of the hard drive to be a first preset threshold when the first fluctuation curve is greater than the reference fluctuation curve; and a second adjustment module, configured to adjust the IOPS of the hard drive to be a second preset threshold when the first fluctuation curve is less than the reference fluctuation curve.

Specific limitations on and beneficial effects of the apparatus for adjusting the random write performance may refer to the limitations on and beneficial effects of the method for adjusting the random write performance described above, and will not be described in detail here. The various modules in the apparatus for adjusting the random write performance may be implemented in whole or in part by software, hardware and a combination of software and hardware. The above modules may be embedded in or independent of a processor in an electronic device in the form of hardware, or may be stored in a memory in the electronic device in the form of software, so that it is convenient for the processor to invoke and execute operations corresponding to the above modules.

The embodiments of the present disclosure provide an electronic device, including the above apparatus for adjusting the random write performance shown in FIG. 2.

Figure 3:
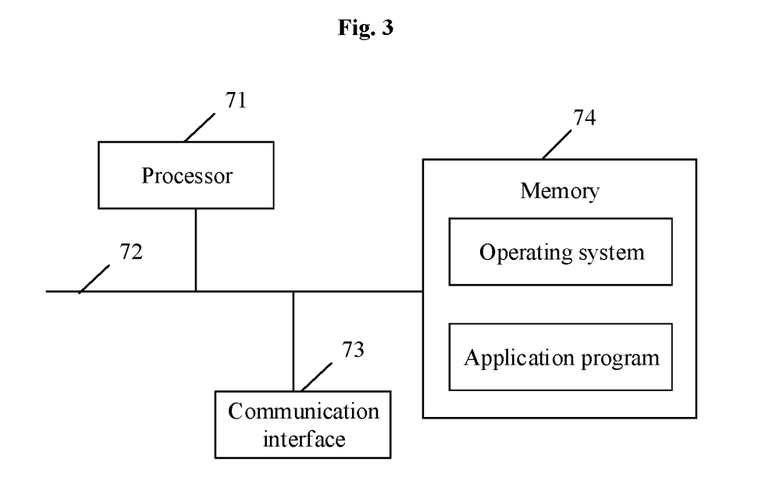
FIG. 3 is a schematic diagram of the hardware structure of an electronic device provided according to the embodiments of the present disclosure.

As shown in FIG. 3, FIG. 3 is a schematic structural diagram of an electronic device provided in an exemplary embodiment of the present disclosure. As shown in FIG. 3, the electronic device may include: at least one processor 71, such as a CPU, at least one communication interface 73, a memory 74, and at least one communication bus 72. The communication bus 72 is configured to achieve connection and communication between these components. The communication interface 73 may include a display and a keyboard. In some exemplary implementations, the communication interface 73 may further include a standard wired interface and a wireless interface. The memory 74 may be a volatile Random Access Memory (RAM) or a non-volatile memory, such as at least one magnetic disk memory. In some exemplary implementations, the memory 74 may also be at least one storage device located away from the aforementioned processor 71. The processor 71 may be combined with the apparatus. The memory 74 stores application programs. The processor 71 invokes program codes stored in the memory 74 to execute the operations of any one of the above methods.

The communication bus 72 may be a Peripheral Component Interconnect (PCI) bus, an Extended Industry Standard Architecture (EISA) bus or the like. The communication bus 72 may be divided into an address bus, a data bus, a control bus, and the like.

The memory 74 may include a volatile memory, such as a RAM. The memory may also include a non-volatile memory, such as a flash memory, a Hard Disk Drive (HDD) or a Solid-State Drive (SSD). The memory 74 may also include a combination of the above kinds of memories.

The processor 71 may be a CPU, a Network Processor (NP), or a combination of a CPU and an NP.

The processor 71 may further include a hardware chip. The above hardware chip may be an Application-Specific Integrated Circuit (ASIC), a Programmable Logic Device (PLD) or a combination of the above. The above PLD may be a Complex Programmable Logic Device (CPLD), a Field-Programmable Gate Array (FPGA), a Generic Array Logic (GAL) or any combination thereof.

In some exemplary implementations, the memory 74 is also configured for storing program instructions. The processor 71 may invoke program instructions to implement the method for adjusting the random write performance shown in the embodiment of FIG. 1 of the present disclosure.

Figure 4:
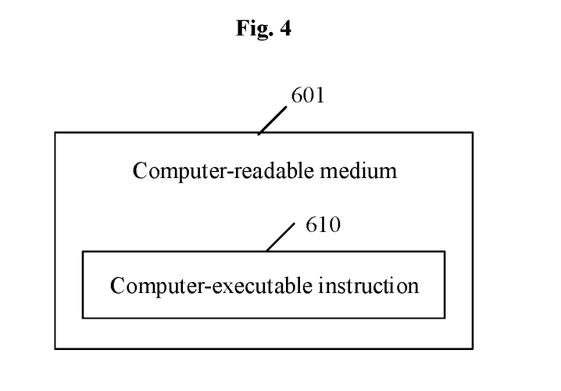
FIG. 4 is a schematic diagram of a computer-readable storage medium provided according to the embodiments of the present disclosure.

FIG. 4 is a schematic diagram of a computer-readable storage medium provided by the embodiments of the present disclosure. As shown in FIG. 4, the embodiments of the present disclosure provide a non-transitory computer storage medium 601. The computer storage medium 601 stores computer-executable instructions 610. The computer-executable instructions 610 may perform the method for adjusting the random write performance in any method embodiment described above. The storage medium 601 may be a magnetic disk, an optical disk, a Read-Only Memory (ROM), an RAM, a flash memory, an HDD, an SSD, or the like; and the storage medium 601 may further include a combination of the above kinds of memories.

Although the embodiments of the present disclosure are described in conjunction with the accompanying drawings, those having ordinary skill in the art may make various modifications and variations without departing from the spirit and scope of the present disclosure. These modifications and variations fall within the scope defined by the accompanying claims.

What is claimed is:

1. A method for adjusting random write performance, comprising:

obtaining a remaining space of a target module of a hard drive, and performing balancing processing on a storage unit of the remaining space;

calculating a quantity of data frames of each storage block in the storage unit based on a balancing processing result to obtain a first data set;

performing convergence processing on the first data set to obtain a second data set; and calculating Input/Output Operations Per Second (IOPS) of the hard drive based on the second data set, and performing write arbitration adjustment on the IOPS of the hard drive;

wherein performing convergence processing on the first data set to obtain the second data set comprises: calculating a quantity of data frames of the remaining space in a steady state based on states of the storage blocks to obtain a second data subset; and performing interpolation processing on data in the second data subset to obtain the second data set;

wherein performing interpolation processing on the data in the second data subset to obtain the second data set further comprises: performing interpolation processing on the data in the second data subset, wherein performing interpolation processing on the data in the second data subset comprises: establishing coordinate axes comprising a horizontal axis representing time t, and a vertical axis representing the quantity y of the data frames of the remaining space, wherein (xi, yi) represents a quantity of data frames cached at a previous time point, and (xi+1, yi+1) represents a latest quantity of data frames; performing linear interpolation on (xi, yi) and (xi+1, yi+1) to obtain a point (x, y) as a linear interpolation result; and obtaining the second data set based on the linear interpolation result;

wherein calculating the IOPS of the hard drive based on the second data set, and performing write arbitration adjustment on the IOPS of the hard drive comprises: obtaining a phase state of the remaining space and the quantity of the data frames in the second data set in the phase state; and obtaining the IOPS of the hard drive based on the quantity of the data frames, and adjusting the IOPS of the hard drive;

wherein adjusting the IOPS of the hard drive comprises: forming a reference fluctuation curve based on a quantity of data frames corresponding to a write arbitration adjustment steady state; determining a fluctuation condition of a first fluctuation curve formed by the second data set and a fluctuation condition of the reference fluctuation curve; and adjusting the IOPS of the hard drive based on the fluctuation conditions;

wherein determining the fluctuation condition of the first fluctuation curve formed by the second data set and the fluctuation condition of the reference fluctuation curve comprises: when the first fluctuation curve is greater than the reference fluctuation curve, increasing the IOPS of the hard drive to be a first preset threshold; and when the first fluctuation curve is less than the reference fluctuation curve, decreasing the IOPS of the hard drive to be a second preset threshold.

2. The method for adjusting the random write performance according to claim 1, wherein obtaining the remaining space of the target module of the hard drive, and performing balancing processing on the storage unit of the remaining space comprises:

determining whether a quantity of storage blocks in the storage unit exceeds a preset threshold;

when the quantity of storage blocks in the storage unit exceeds the preset threshold, performing a first operation of writing data into the storage unit in a first state; and when the quantity of storage blocks in the storage unit does not exceed the preset threshold, performing a second operation of writing data into the storage unit in a second state.

3. The method for adjusting the random write performance according to claim 2, wherein determining whether the quantity of the storage blocks in the storage unit exceeds the preset threshold comprises:

determining whether the quantity of the storage blocks in a storage unit with a smallest quantity of free storage blocks and the quantity of the storage blocks in a storage unit with a largest quantity of storage blocks exceed the preset threshold.

4. The method for adjusting the random write performance according to claim 2, wherein when the quantity of storage blocks in the storage unit exceeds the preset threshold, performing the first operation of writing data into the storage unit in the first state comprises:

when the quantity exceeds the preset threshold, skipping state determination on the storage unit, and selecting the storage unit with the smallest quantity of free storage blocks for data writing.

5. The method for adjusting the random write performance according to claim 2, wherein when the quantity of storage blocks in the storage unit does not exceed the preset threshold, performing the second operation of writing data into the storage unit in the second state comprises:

when the quantity does not exceed the preset threshold, determining whether the storage unit is in a free state, and when the storage unit is in the free state, selecting the storage unit for data writing; when a plurality of storage units are in free states, selecting a storage unit with a smallest quantity of free storage blocks for data writing.

6. The method for adjusting the random write performance according to claim 1, wherein obtaining the phase state of the remaining space comprises:

obtaining a first phase based on a range from a quantity of data frames corresponding to a write arbitration adjustment start state to a quantity of data frames corresponding to a write arbitration adjustment forbidden state;

obtaining a second phase based on a range from the quantity of the data frames corresponding to the write arbitration adjustment forbidden state to a quantity of data frames corresponding to a write arbitration adjustment stop state;

obtaining a third phase based on the quantity of the data frames corresponding to the write arbitration adjustment stop state; and calculating the IOPS of the hard drive based on the first phase, the second phase, and the third phase.

7. The method for adjusting the random write performance according to claim 1, wherein calculating the quantity of the data frames of the remaining space in the steady state based on the states of the storage blocks to obtain the second data subset comprises:

when B1, B2, B3, . . . , and Bn represent changes in the quantity of the storage blocks, the remaining space where the remaining data frames are located is calculated as FB1, FB2, FB3, . . . , and FBn, and avgFB1, avgFB2, avgFB3, . . . and avgFBn correspond to a historical average data frame quantity space at Bn, setting avgFB1=FB1, and calculating avgFBn+1= ($\beta$avgFBn+FBn+1)/($\beta$+1), wherein a value of $\beta$ controls to perform averaging only on the latest multiple FBns.

8. The method for adjusting the random write performance according to claim 7, wherein the value of $\beta$ is 0.9.

9. The method for adjusting the random write performance according to claim 1, wherein the first preset threshold is equal to (1+$\delta$)*IOPS, and the second preset threshold is equal to (1−$\zeta$)*IOPS, wherein $\delta$ is a percentage and $\zeta$ is a percentage.

10. An electronic device, comprising a memory and a processor, wherein the memory stores computer instructions, and the processor executes the computer instructions to implement following operations:

obtaining a remaining space of a target module of a hard drive, and performing balancing processing on a storage unit of the remaining space;

calculating a quantity of data frames of each storage block in the storage unit based on a balancing processing result to obtain a first data set;

performing convergence processing on the first data set to obtain a second data set; and calculating Input/Output Operations Per Second (IOPS) of the hard drive based on the second data set, and performing write arbitration adjustment on the IOPS of the hard drive;

wherein performing convergence processing on the first data set to obtain the second data set comprises: calculating a quantity of data frames of the remaining space in a steady state based on states of the storage blocks to obtain a second data subset; and performing interpolation processing on data in the second data subset to obtain the second data set;

wherein performing interpolation processing on the data in the second data subset to obtain the second data set further comprises: performing interpolation processing on the data in the second data subset, wherein performing interpolation processing on the data in the second data subset comprises: establishing coordinate axes comprising a horizontal axis representing time t, and a vertical axis representing the quantity y of the data frames of the remaining space, wherein (xi, yi) represents a quantity of data frames cached at a previous time point, and (xi+1, yi+1) represents a latest quantity of data frames; performing linear interpolation on (xi, yi) and (xi+1, yi+1) to obtain a point (x, y) as a linear interpolation result; and obtaining the second data set based on the linear interpolation result;

wherein calculating the IOPS of the hard drive based on the second data set, and performing write arbitration adjustment on the IOPS of the hard drive comprises: obtaining a phase state of the remaining space and the quantity of the data frames in the second data set in the phase state; and obtaining the IOPS of the hard drive based on the quantity of the data frames, and adjusting the IOPS of the hard drive;

wherein adjusting the IOPS of the hard drive comprises: forming a reference fluctuation curve based on a quantity of data frames corresponding to a write arbitration adjustment steady state; determining a fluctuation condition of a first fluctuation curve formed by the second data set and a fluctuation condition of the reference fluctuation curve; and adjusting the IOPS of the hard drive based on the fluctuation conditions;

wherein determining the fluctuation condition of the first fluctuation curve formed by the second data set and the fluctuation condition of the reference fluctuation curve comprises: when the first fluctuation curve is greater than the reference fluctuation curve, increasing the IOPS of the hard drive to be a first preset threshold; and when the first fluctuation curve is less than the reference fluctuation curve, decreasing the IOPS of the hard drive to be a second preset threshold.

11. The electronic device according to claim 10, wherein obtaining the remaining space of the target module of the hard drive, and performing balancing processing on the storage unit of the remaining space comprises:
determining whether a quantity of storage blocks in the storage unit exceeds a preset threshold;
when the quantity of storage blocks in the storage unit exceeds the preset threshold, performing a first operation of writing data into the storage unit in a first state; and
when the quantity of storage blocks in the storage unit does not exceed the preset threshold, performing a second operation of writing data into the storage unit in a second state.

12. A non-transitory computer-readable storage medium, wherein the computer-readable storage medium stores computer instructions, and the computer instructions, when running in a computer, cause the computer to implement following operations:

obtaining a remaining space of a target module of a hard drive, and performing balancing processing on a storage unit of the remaining space;

calculating a quantity of data frames of each storage block in the storage unit based on a balancing processing result to obtain a first data set;

performing convergence processing on the first data set to obtain a second data set; and calculating Input/Output Operations Per Second (IOPS) of the hard drive based on the second data set, and performing write arbitration adjustment on the IOPS of the hard drive;

wherein performing convergence processing on the first data set to obtain the second data set comprises: calculating a quantity of data frames of the remaining space in a steady state based on states of the storage blocks to obtain a second data subset; and performing interpolation processing on data in the second data subset to obtain the second data set;

wherein performing interpolation processing on the data in the second data subset to obtain the second data set further comprises: performing interpolation processing on the data in the second data subset, wherein performing interpolation processing on the data in the second data subset comprises: establishing coordinate axes comprising a horizontal axis representing time t, and a vertical axis representing the quantity y of the data frames of the remaining space, wherein (xi, yi) represents a quantity of data frames cached at a previous time point, and (xi+1, yi+1) represents a latest quantity of data frames: performing linear interpolation on (xi, yi) and (xi+1, yi+1) to obtain a point (x, y) as a linear interpolation result; and obtaining the second data set based on the linear interpolation result;

wherein calculating the IOPS of the hard drive based on the second data set, and performing write arbitration adjustment on the IOPS of the hard drive comprises: obtaining a phase state of the remaining space and the quantity of the data frames in the second data set in the phase state; and obtaining the IOPS of the hard drive based on the quantity of the data frames, and adjusting the IOPS of the hard drive;

wherein adjusting the IOPS of the hard drive comprises: forming a reference fluctuation curve based on a quantity of data frames corresponding to a write arbitration adjustment steady state; determining a fluctuation condition of a first fluctuation curve formed by the second data set and a fluctuation condition of the reference fluctuation curve; and adjusting the IOPS of the hard drive based on the fluctuation conditions;

wherein determining the fluctuation condition of the first fluctuation curve formed by the second data set and the fluctuation condition of the reference fluctuation curve comprises: when the first fluctuation curve is greater than the reference fluctuation curve, increasing the IOPS of the hard drive to be a first preset threshold; and when the first fluctuation curve is less than the reference fluctuation curve, decreasing the IOPS of the hard drive to be a second preset threshold.

* * * * *